United States Patent
Tokita et al.

(10) Patent No.: US 7,927,745 B2
(45) Date of Patent: Apr. 19, 2011

(54) NEGATIVE ELECTRODE FOR RECHARGEABLE LITHIUM BATTERY AND RECHARGEABLE LITHIUM BATTERY INCLUDING THE SAME

(75) Inventors: Tetsuo Tokita, Minoh (JP); Hideaki Maeda, Minoh (JP); Naoya Kobayashi, Minoh (JP); Sung-Soo Kim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 307 days.

(21) Appl. No.: 12/004,102

(22) Filed: Dec. 20, 2007

(65) Prior Publication Data

US 2008/0241688 A1 Oct. 2, 2008

(30) Foreign Application Priority Data

Dec. 20, 2006 (JP) .................................. 2006-342896
Nov. 28, 2007 (KR) ......................... 10-2007-0122155

(51) Int. Cl.
*H01M 4/58* (2010.01)
*H01M 4/48* (2010.01)
*H01M 10/52* (2006.01)

(52) U.S. Cl. ................ 429/231.95; 429/218.1; 429/220; 429/221

(58) Field of Classification Search ... 429/218.1–231.95
See application file for complete search history.

(56) References Cited

U.S. PATENT DOCUMENTS

| 6,753,112 | B2 * | 6/2004 | Ooya et al. ................... 429/232 |
| 2002/0039684 | A1 * | 4/2002 | Matsubara et al. ........ 429/231.4 |
| 2003/0207177 | A1 * | 11/2003 | Matsubara et al. ........ 429/231.8 |
| 2004/0157123 | A1 * | 8/2004 | Sasaki et al. ............... 429/218.1 |
| 2005/0079417 | A1 * | 4/2005 | Kim et al. .................. 429/231.2 |

FOREIGN PATENT DOCUMENTS

| EP | 1 511 101 | 3/2005 |
| EP | 1936720 A1 | 6/2008 |
| JP | 06-302320 | 10/1994 |
| JP | 11-144734 | 5/1999 |
| JP | 2002-216753 | 8/2002 |
| JP | 2003-068305 | 3/2003 |
| WO | WO 01/22507 | 3/2001 |

OTHER PUBLICATIONS

*Search report* from the European Patent Office issued in Applicant's corresponding European Patent Application No. 07123875.2 dated Apr. 9, 2008.
Korean Office Action issued on Oct. 15, 2010 for the corresponding Korean Patent Application No. 2007-0122155 and Request for Entry of the Accompanying Document herewith.

* cited by examiner

*Primary Examiner* — Basia Ridley
*Assistant Examiner* — Jacob Buchanan
(74) *Attorney, Agent, or Firm* — Robert E. Bushnell, Esq.

(57) ABSTRACT

A negative electrode for a rechargeable lithium battery includes a current collector and a negative active mass disposed on the current collector. The negative active mass includes a negative active material including a lithium vanadium composite oxide and a crystalline structure aid for inhibiting deterioration of a crystalline structure. The negative active material can inhibit an irreversible crystalline structure change during charge and discharge, and does not incur decomposition of an electrolyte resulting in improvement of a cycle-life of a rechargeable lithium battery.

21 Claims, 4 Drawing Sheets

NEGATIVE ELECTRODE FOR RECHARGEABLE LITHIUM BATTERY AND RECHARGEABLE LITHIUM BATTERY INCLUDING THE SAME

CLAIM OF PRIORITY

This application makes reference to, incorporates the same herein, and claims all benefits accruing under 35 U.S.C. §119 from applications earlier filed in the Japanese Patent Office on the 20 of Dec. 2006 and there duly assigned Serial No. 2006-342896, and in the Korean Intellectual Property Office on the 28 of Nov. 2007 and there duly assigned Serial No. 10-2007-0122155.

BACKGROUND OF THE INVENTION

1. Field of the Invention

The present invention relates to a negative electrode for a rechargeable lithium battery and to a rechargeable lithium battery including that negative electrode. More particularly, the present invention relates to a negative electrode including a lithium vanadium composite oxide and a rechargeable lithium battery including that lithium vanadium composite oxide.

2. Description of the Related Art

The conventional rechargeable lithium battery includes a positive active material of $LiCoO_2$, a negative active material of graphite, and an electrolyte of a non-aqueous solution. Rechargeable lithium batteries have been widely used as a power source for electronic devices such as cellular phones, digital still cameras, digital video cameras, and laptop computers, and for providing electrical power to other portable appliances.

Carbon-based materials such as artificial or natural graphite, hard carbon, and so on have been used for a negative active material for a rechargeable lithium battery. The graphite of the carbon-based material increases discharge voltages and energy density for these batteries because it has a low discharge potential of −0.2V, compared to lithium. A battery using graphite as a negative active material has a high average discharge potential of 3.6V and has excellent energy density.

Moreover, graphite is most comprehensively used among the aforementioned carbon-based materials since graphite guarantees a better life-cycle for a battery due to its outstanding reversibility during charge and discharge cycles.

Graphite active materials however, have a low density and consequently a low capacity (theoretical capacity: 2.2 g/cc) in terms of energy density per unit volume when used as a graphite as a negative active material.

Furthermore, the use of active graphite materials involves some danger such as explosion or even combustion when a battery is misused or overcharged or otherwise abused, because graphite is likely to react to an organic electrolyte at a high discharge voltage.

In order to ameliorate these problems, substantial research on an oxide negative electrode has recently been performed. For example, a negative active material of $Li_aMg_bVO_c$ where:

$$(0.05 \leq a \leq 3, 0.12 \leq b \leq 2, 2 \leq 2c-a-2b \leq 5)$$

is disclosed in Japanese Patent Publication No. 2002-216753 to Yamamoto et al., entitled Lithium Secondary Battery, Negative Electrode Material for the Same and Manufacturing Method of the Same, published on 2 Aug. 2002. Japanese Patent laid-open No. 2003-68305 to Yamamoto et al., entitled Negative Material for Secondary Lithium Battery and Its Manufacturing Method, published on 7 Mar. 2003, discloses a negative active material for a rechargeable lithium battery that includes a lithium vanadium composite oxide. In Japanese Patent laid-open No. 2003-68305, the lithium vanadium composite oxide has a significantly lower discharge potential relative to lithium to provide a rechargeable lithium battery having a high energy density.

A lithium vanadium composite oxide however, undergoes irreversible crystalline structure deterioration during charge and discharge, which contributes to the decomposition of an electrolyte. As a result, the lithium vanadium composite oxide exacerbates deterioration of the life-cycle, and thus reduces the useful life-time of a rechargeable lithium battery.

SUMMARY OF THE INVENTION

It is therefore, one object of the present invention to provide an improved negative active material and a rechargeable lithium battery including an improved negative active material.

It is another object to provide a negative electrode formed of lithium vanadium composite oxide, and a rechargeable lithium battery including a negative electrode formed of lithium vanadium composite oxide.

One embodiment of the present invention provides a negative electrode including a negative active material that can inhibit irreversible crystalline structure deterioration during charge and discharge and does not incur decomposition of an electrolyte resulting in improvement of a cycle-life of a rechargeable lithium battery.

Another embodiment of the present invention provides a rechargeable lithium battery including the negative electrode.

The embodiments of the present invention are not limited to the above technical purposes, and a person of an ordinary skill in the art can understand other technical purposes.

According to one embodiment of the present invention, a negative electrode for a rechargeable lithium battery may be constructed with a current collector and a negative active mass disposed on the current collector. The negative active mass includes a negative active material including a lithium vanadium composite oxide and a crystalline structure aid.

According to another embodiment of the present invention, a rechargeable lithium battery which includes the negative electrode is provided. Another embodiment of the present invention will be described in the following detailed description.

Since the crystalline structure aid suppresses deterioration of crystalline structure of the negative active material during charge and discharge, a negative electrode including the crystalline structure aid can inhibit decomposition of a non-aqueous electrolyte. Therefore, the negative electrode can improve cycle-life and capacity of a rechargeable lithium battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Exemplary embodiments of the present invention will hereinafter be described in detail. These embodiments are only exemplary however, and the present invention is not limited thereto.

Figure 2:
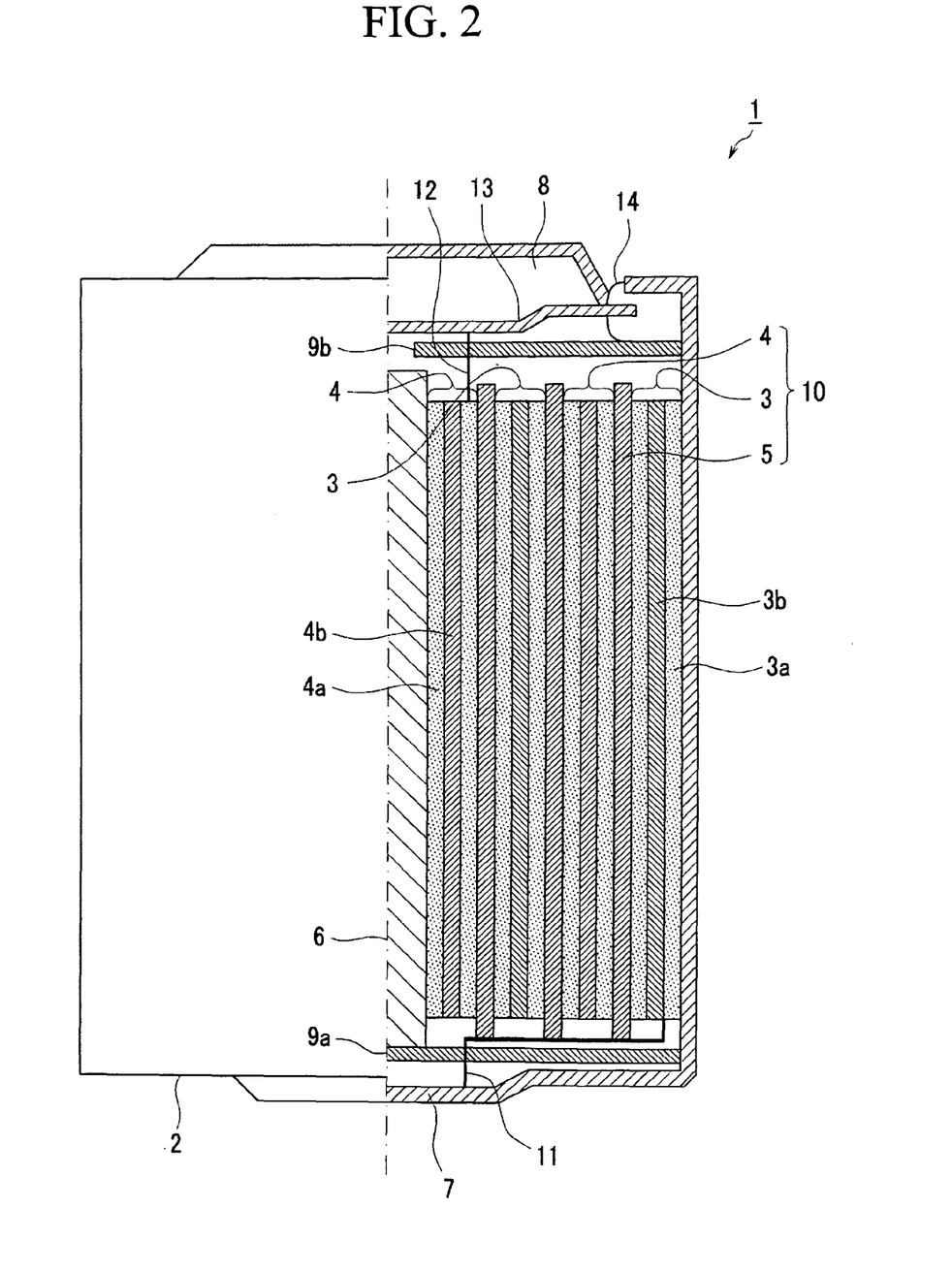
FIG. 2 is a vertical cross-sectional elevation view of a non-aqueous rechargeable battery constructed as one embodiment of the present invention.

FIG. 2 is a vertical cross-sectional elevation view of a non-aqueous rechargeable battery that may be constructed as one embodiment of the present invention. Non-aqueous rechargeable battery 1 may be configured as a spirally wound cylindrical battery. Non-aqueous rechargeable battery 1 may include center pin 6 and electrode assembly 10 wound around center pin 6. Herein, electrode assembly 10 collectively includes positive electrode 3 and negative electrode 4, and separator 5 inserted between positive electrode 3 and negative electrode 4. Accordingly, electrode assembly 10 may be arranged with a cylindrical structure. Positive electrode 3 may be formed by disposing positive active mass 3a including a positive active material on both surfaces of positive current collector 3b. Negative electrode 4 may be formed by disposing negative active mass 4a including a negative active material on both surfaces of negative current collector 4b. Cylindrical electrode assembly 10 may be housed in cylindrical case 2 with a hollow interior, and is impregnated with an electrolyte (not separately shown). In the particular embodiment illustrated, positive electrode 3 contacts case 2, and has positive terminal 7 that protrudes at the bottom of case 2. This particular embodiment may also be constructed with electrode assembly 10 mounted with insulating plates 9b and 9a at the top and bottom thereof. Positive current collector 3b may pass, as shown, through insulating plate 9a and contacts positive terminal 7 by way of positive electrode lead 11. Safety plate 13 may be mounted above insulating plate 9b located at the opened base end of case 2 in the same direction as insulating plate 9b. Negative terminal 8 may be shaped as a convex cap and is mounted on safety plate 13 in the opposite direction to safety plate 13. Negative current collector 4b in this embodiment may be oriented to pass through insulating plate 9b and contacts negative terminal 8 by way of negative electrode lead 12. In addition, safety plate 13 and the edge of negative terminal 8 may be sealed by an electrically insulating gasket 14, which may separate safety plate 13 and negative terminal 8 from positive terminal 7.

The negative electrode for a rechargeable lithium battery includes a current collector and a negative active mass disposed on the current collector. The negative active mass includes a negative active material including a lithium vanadium composite oxide and a crystalline structure aid for inhibiting deterioration of a crystalline structure.

The crystalline structure aid may be an oxide of an element of selected from the group consisting of cerium, zirconium, iron, copper, and combinations thereof. More specific examples of the crystalline structure aid may be selected from the group consisting of cerium oxide, a cerium composite oxide, zirconium oxide, zirconium composite oxide, an iron composite oxide, iron oxide, copper oxide, and combinations thereof.

The negative active material includes a lithium vanadium composite oxide represented by $Li_xM_yV_zO_{2+d}$ where $0.1 \leq x \leq 2.5$, $0 \leq y \leq 0.5$, $0.5 \leq z \leq 1.5$, $0 \leq d \leq 0.5$, and M is selected from the group consisting of Al, Cr, Mo, Ti, W, Zr, and combinations thereof.

The crystalline structure aid may be included in an amount of 20 wt % or less with respect to a total weight of the negative active mass in the negative electrode of a rechargeable lithium battery. The crystalline structure aid is partially attached to a surface of the negative active material in a minimum amount.

The rechargeable lithium battery includes the above negative electrode, a positive electrode including a positive active material, and a non-aqueous electrolyte.

Hereinafter, particular embodiments of the present invention will be described. The rechargeable lithium battery according to one embodiment of the present invention includes a positive electrode, a negative electrode, and a non-aqueous electrolyte.

The negative electrode includes a current collector and a negative active mass on the current collector. The negative active mass includes a negative active material including a lithium vanadium composite oxide and a crystalline structure aid for inhibiting deterioration of a crystalline structure. The above constitution of the negative electrode can improve cycle-life performance of a rechargeable lithium battery.

The positive electrode, negative electrode, and non-aqueous electrolyte that constitute the rechargeable lithium battery will be described as follows.

The positive electrode of the rechargeable lithium battery includes a positive active mass including a positive active material being capable of intercalating and deintercalating lithium ions, a conductive agent, and a binder; and a positive current collector on which the positive active mass is disposed.

The positive active mass may be formed in a disk-shape to provide a pellet-shaped or sheet-shaped electrode.

The positive active material may be a Li-containing compound, an oxide, a sulfide, and so on. The positive active material may include at least one metal selected from the group consisting of Mn, Co, Ni, Fe, Al, and combinations thereof.

Examples of the positive active material include $LiMn_2O_4$, $LiCoO_2$, $LiNiO_2$, $LiFeO_2$, $LiNi_{1/3}Co_{1/3}Mn_{1/3}O_2$, $LiNi_{0.8}Co_{0.2}O_2$, and so on.

The binder may include polyvinylidene fluoride, polyethylene, and so on.

The conductive agent may include a carbon-based material such as carbon black, ketjen black, graphite, and so on.

The positive current collector may include a metal foil or a metal net formed of aluminum, stainless steel, and so on.

The negative electrode includes a negative active mass including a negative active material being capable of intercalating and deintercalating lithium ions, a crystalline structure aid for inhibiting deterioration of a crystalline structure, a binder, and a conductive agent as needed; and a negative current collector on which the negative active mass is disposed.

The negative active mass may be formed in a disk-shape to fabricate a pellet-shaped or sheet-shaped electrode.

The binder for the negative electrode may be any organic or inorganic material that can be dispersed or dissolved in a solvent along with the negative active material and bind the negative active material after solvent removal.

Further, the binder may be a material that can bind the negative active material by mixing the negative active material and then press-forming.

The binder may be selected from the group consisting of a vinyl-based resin, a cellulose-based resin, a phenol resin, a thermoplastic resin, a thermosetting resin, and so on. Specifically, the binder may be polyvinylidene fluoride, polyvinyl alcohol, carboxylmethyl cellulose, styrene butadiene rubber, and so on.

The negative electrode may further include a conductive agent such as carbon black, a graphite powder, a carbon fiber, a metal powder, a metal fiber, and so on, in addition to the negative active material and binder.

The negative current collector may include a metal foil or a metal net formed of copper.

The negative active material includes a lithium vanadium composite oxide represented by $Li_xM_yV_zO_{2+d}$ where:

$0.1 \leq x \leq 2.5, 0 \leq y \leq 0.5, 0.5 \leq z \leq 1.5, 0 \leq d \leq 0.5$, and M is selected from the group consisting of Al, Cr, Mo, Ti, W, Zr, and combinations thereof).

The $Li_xM_yV_zO_{2+d}$ is composed by substituting Co in $LiCoO_2$ which is common source for a positive active material with Li, V (vanadium) or other transition elements, and a metal element such as Al, Mo, W, Ti, Cr, or Zr. It can provide discharge potential and cycle-life characteristics at similar levels to those of graphite.

When the lithium vanadium composite oxide represented in the composition formula is used, it is possible to provide a capacity per unit volume of 1000 mAh/cc or more.

$Li_xM_yV_zO_{2+d}$ has a R-3M structure in which Li and oxygen, and transition element and oxygen are alternatively stacked.

As shown in the structure of $LiVO_2$, lithium is enriched and is reversibly intercalated and deintercalated by substituting some of transition elements (V) with Li and other transition elements (for example, Ti, Mo, Cr, and Al).

The $LiVO_2$ structure means that the V metal ion layer (Li is substituted with a third metal) is disposed in the oxygen ion octahedron site between the oxygen ions having a hexagonal closed packing; and Li ions are disposed in the lower layer of the octahedron site. If lithium is intercalated thereto to provide $Li_2VO_2$, the structure is also changed into what includes a V metal ion layer (Li is substituted with the third metal), an oxygen ion layer, a Li layer, an oxygen ion layer, and a V metal ion layer (Li is substituted with the third metal).

In order to facilitate the intercalation and deintercalation of lithium at a low potential, some Li of the V metal ion layer of the $Li_xM_yV_zO_{2+d}$ is substituted with the other third metal (M element) to increase the lattice constant which is a distance along with an a axis. Thereby, the lithium layer is broader and it facilitates the intercalation and deintercalation of the lithium in the crystalline structure. The easy intercalation and deintercalation of the lithium increases the diffusion rate of the lithium upon charging and discharging the battery so that the cycle-life and the charge and discharge efficiency of the battery are improved.

According to the embodiment, it includes a lithium vanadium composite oxide having a composition of $Li_xM_yV_zO_{2+d}$ since the lattice structure is easily changed and the lithium is facilitated in intercalation and deintercalation.

According to one embodiment, the $Li_xM_yV_zO_{2+d}$ has an average oxidation number of vanadium (V) ranging from +1 to +4. According to another embodiment, it ranges from +1 to +3.

Vanadium (V) of the lithium vanadium composite oxide has an oxidation reduction potential of one Volt (1V) or less relative to a lithium metal when a lithium vanadium composite oxide is used for a positive active material as the oxidation reduction valence ranges from +1 to +4.

On the other hand, the vanadium oxide of the conventional positive active material has Ian oxidation reduction reaction couple having +3 to +4 or +4 or +5, and the early oxidation reduction potential is two Volts (2V) or more relative to the lithium metal.

The oxidation reduction potential of the lithium vanadium composite oxide according to the present invention is one Volt (1V) or less, so it is possible for LixMyVzO2+d to carry out the oxidation reduction reaction at a low potential.

That is, when the lithium vanadium composite oxide having a composition of $Li_xM_yV_zO_{2+d}$ is used as a negative active material, it is possible to increase a discharge voltage of battery.

When x, y, z, and d that are referred to for the composition ratios of $Li_xM_yV_zO_{2+d}$ are out of the ranges of:

$0.1 \leq x \leq 2.5, 0 \leq y \leq 0.5, 0.5 \leq z \leq 1.5$, and $0 \leq d \leq 0.5$, it is not preferable since the average potential relative to the lithium metal increases to two and one-half Volts (2.5V) or more, and the resultant transit discharge voltage is decreased.

Furthermore, the $Li_xM_yV_zO_{2+d}$ has a distance ratio between crystalline axes (c/a axis ratio) ranging from 2.5 to 6.5 before intercalating lithium. According to one embodiment, it ranges from 3.0 to 6.2. When the distance ratio between crystalline axes (c/a axis ratio) before intercalating lithium deviates from the range, it becomes difficult to intercalate and deintercalate lithium and the lithium intercalation and deintercalation potential is increased to six-tenths of one Volt (0.6V) or more, so a hysteresis phenomenon in which an increase in the potential difference between the intercalation and the deintercalation occurs due to the oxygen contribution.

Furthermore, $Li_xM_yV_zO_{2+d}$ has a distance ratio of 3.5 to 7.0 between crystalline axes (c/a axis ratio) after intercalating lithium. According to another embodiment, it ranges from 4.0 to 7.0. When it is less than 3.5, the lattice change is decreased due to the intercalated Li, so it is difficult to diffuse Li in the lattice. On the other hand, when it is more than 7.0, it is hard to maintain the crystalline structure.

In addition, the $Li_xM_yV_zO_{2+d}$ has a theoretical density per unit volume of 4.2 g/cc. When an electrode plate is prepared in accordance with one embodiment of the present invention, the actual density per unit volume is about 3.0 g/cc or more.

Furthermore, when the capacity of $Li_xM_yV_zO_{2+d}$ is 300 mAh/g, the theoretical capacity per unit volume is 1200 mAh/cc or more, and the actual capacity per unit volume is 900 mAh/cc or more.

This demonstrates that the negative active material prepared according to one embodiment improves energy density to about twice that of the conventional graphite negative active material. The graphite has a theoretical density per unit volume of 2.0 g/cc, a density of 1.6 g/cc, and a capacity of 360 mAh/g when it is actually applied to a negative electrode.

The crystalline structure aid for inhibiting deterioration of a crystalline structure may be an oxide of an element selected from the group consisting of cerium, zirconium, iron, copper, and combinations thereof. More specific examples of the crystalline structure aid may be selected from the group consisting of cerium oxide, a cerium composite oxide, zirconium oxide, a zirconium composite oxide, an iron composite oxide, iron oxide, copper oxide, and combinations thereof. The cerium composite oxide may be a composite oxide including an element selected from the group consisting of Ti, W, Ni, Cu, Fe, Al, Si, Be, Mg, Ca, Sr, Ba, Ra, Bi, Y, Co, Mn, Nb, Mo, Sn, a rare earth element, and combinations thereof except cerium. The zirconium composite oxide may be a composite oxide including an element selected from the group consisting of Ti, W, Ni, Cu, Fe, Al, Si, Be, Mg, Ca, Sr, Ba, Ra, Bi, Y, Co, Mn, Nb, Mo, Sn, Ce, a rare earth element, and combinations thereof except zirconium. For example, a cerium-zirconium composite oxide may be $Ce_xZ_yM_zO_{2-a}$ where $x+y+z=1$, $0<a<1$, and M is selected from the group consisting of Ti, W, Ni, Cu, Fe, Al, Si, Be, Mg, Ca, Sr, Ba, Ra, Bi, Y, Co, Mn, Nb, Mo, Sn, a rare earth element, and combinations thereof.

The iron composite oxide may be a composite oxide including an element selected from the group consisting of Ti, W, Ni, Cu, Fe, Al, Si, Be, Mg, Ca, Sr, Ba, Ra, Bi, Y, Co, Mn, Nb, Mo, Sn, Ce, a rare earth element, and combinations thereof except iron. Examples of the iron composite oxide may be selected from the group consisting of $LaSrFeO_{3-x}$, $CaTi_{0.8}Fe_{0.2}O_{3-x}$, $SrFeCo_{0.5}O_{4-x}$ where x is a trace amount, and combinations thereof. In one embodiment, x is in the range of 0.4 or less. The copper oxide is $CuO_{2-x}$, where x is trace amount. In one embodiment, x is in the range of 0.2 or less. The trace refers to a value that is out of a general stoichiometric ratio.

Further, the negative electrode has a 3 to 6 intensive ratio (003/001) of the peak of the (003) plane intensity upon the discharge to the peak of the (001) plane intensity upon the charge when it is charged and discharged at a charge and discharge speed of between 0.1 and 1 C for several to several tens of cycles, then it is measured for X-ray diffraction intensity using CuK at a scanning speed of 1°/min.

In the result of the X-ray diffraction, when the intensity ratio (003/001) is less than three (3), it means that the reaction is not reversible, so the structure would be broken to deteriorate the crystallinity. On the other hand, when it is more than six (6), the reaction is not carried out in the early stage even though the crystallinity has not deteriorated.

The conventional lithium rechargeable battery decrease the peak of the (003) plane upon the discharge along with the repeated charge and discharge, so the intensity ratio (003)/(001) is decreased to about 1.5, which indicates the crystalline structure of the negative active material is broken. According to one embodiment, it includes a crystalline structure aid, so the intensity ratio (003)/(001) upon the early charge and discharge does not decrease under four (4), which indicates that the crystalline structure of the negative active material is maintained.

The crystalline structure aid may be coated on at least one part of the surface of the negative active material to adhere to the negative active material, and to present near to the negative active material. According to one embodiment, the crystalline structure aid is coated on at least one part of the surface of the negative active material. This is advantageous since it can prevent the crystallinity of the negative active material from deteriorating.

The mechanism of the crystalline structure aid for inhibiting the negative active material can be explained with the negative active material having the composition of $Li_{1.1}V_{0.9}O_2$.

When the lithium vanadium composite oxide having a composition of $Li_{1.1}V_{0.9}O_2$ is charged and discharged, that is, when lithium ions are intercalated and deintercalated to lithium vanadium composite oxide, the composition is reversibly shifted from $Li_{1.1}V_{0.9}O_2$ (discharge) to $Li_{2.1}V_{0.9}O_2$ (charge).

$Li_{1.1}V_{0.9}O_2$ and $Li_{2.1}V_{0.9}O_2$ always have a hexagonal structure. The spacing group of $Li_{1.1}V_{0.9}O_2$ is R3(-)m, and the spacing group of $Li_{2.1}V_{0.9}O_2$ is P3m1.

Herein, the "3(-)" indicates a symbol putting a bar (-) upon "3", that is, an overstrike.

When the negative active material including the lithium vanadium composite oxide is repeatedly charged and discharged, or subjected to high-rate discharge, one part of the lithium vanadium composite oxide deintercalates oxygen when the lithium ions are deintercalated. Thereby, the discharged oxide is changed to P3m1 $Li_{1.1}V_{0.9}O_{2-x}$ instead of R3(-)m $Li_{1.1}V_{0.9}O_2$.

When the negative active material is changed to $Li_{1.1}V_{0.9}O_{2-x}$, having a P3m1 spacing group, it does not participate in the charge and discharge reaction, and the intercalated oxygen decomposes the non-aqueous electrolyte with oxygen. Therefore, it could cause deterioration of the charge and discharge capacity.

According to one embodiment, the crystalline structure aid that is capable of absorbing and releasing oxygen is present on the surface or near the lithium vanadium oxide.

Thereby, by supplying oxygen to the oxygen-lost spacing group of P3m1 $Li_{1.1}V_{0.9}O_{2-x}$, it recovers the crystalline group of the spacing group of R3(-)m $Li_{1.1}V_{0.9}O_2$, in which the oxygen is not lost. Thereby, the charge and discharge capacity is recovered, and the oxidation decomposition of a non-aqueous electrolyte is suppressed by absorbing the oxygen to the crystalline structure aid.

The crystalline structure aid may be included in an amount of 20 wt % or less with respect to the total weight of the negative active material. In one embodiment, the crystalline structure aid may be included in an amount of 10 wt % or less. In another embodiment, the crystalline structure aid may be included in an amount of 5 wt % or less. In a further embodiment, the crystalline structure aid may be included in an amount of 0.001 wt % to 5 wt %.

Even though the crystalline structure aid is included in a small amount, a desirable effect can be realized. However, in one embodiment, the crystalline structure aid may be used in an amount of 0.001 wt % or more based on the total weight of the negative active mass. When the crystalline structure aid is not added, the crystalline structure of the negative active material may be deteriorated. In addition, when the amount of the crystalline structure aid is 20 wt % or less, the crystalline structure aid may not increase internal resistance of the negative electrode to inhibit decrease of energy density. When the amount of the crystalline structure aid is 10 wt % or less based on the total weight of the negative active mass, cycle-life of a rechargeable lithium battery may be improved. When the amount of the crystalline structure aid is 5 wt % or less based on the total weight of the negative active mass, high-rate discharge characteristics of a rechargeable lithium battery may be improved.

As described above, the crystalline structure aid is disposed on the surface or near the $Li_xM_yV_zO_{2+d}$, and thereby the crystallinity of the $Li_xM_yV_zO_{2+d}$ may not be deteriorated and decomposition of a non-aqueous electrolyte may be suppressed. As a result, cycle characteristics of a battery may be improved.

The negative electrode may be fabricated in accordance with the following two methods.

In one method, a $Li_xM_yV_zO_{2+d}$ lithium vanadium composite oxide, a crystalline structure aid, a binder, and a conducting agent as needed are mixed to provide a mixture, and then the mixture is added to a binder dissolved in an organic solvent to prepare an active material composition. The active material composition is applied on a current collector such as a copper foil, and the organic solvent is removed by heating at about 100° C. and drying for six (6) hours to fabricate a sheet-shaped negative active mass disposed on a current collector. The fabricated negative electrode includes a lithium vanadium composite oxide and a crystalline structure aid near the oxide.

In another method, a $Li_xM_yV_zO_{2+d}$ lithium vanadium composite oxide and a crystalline structure aid are mixed, and then fired at 800° C. for three (3) hours under a nitrogen atmosphere.

The resultant product is mixed with a binder and a conducting agent as needed to prepare a mixture, and then the mixture is added to a binder dissolved in an organic solvent to prepare an active material composition. The active material composition is applied on a current collector such as a copper foil, and the organic solvent is removed by heating at about 100 to about 120° C. and drying for six (6) hours to fabricate a sheet-shaped negative active mass disposed on a current collector. The fabricated negative electrode includes a lithium vanadium composite oxide and a crystalline structure aid partially attached to the oxide.

The non-aqueous electrolyte is a lithium salt dissolved in a non-aqueous solvent.

The non-aqueous solvent generally includes a cyclic carbonate, a linear carbonate, or combinations thereof. The combinations of a cyclic carbonate and a linear carbonate include ethylene carbonate and dimethyl carbonate; ethylene carbonate and methylethyl carbonate; ethylene carbonate and diethylcarbonate; propylene carbonate and dimethyl carbonate; propylene carbonate and methylethyl carbonate; propylene carbonate and diethylcarbonate; ethylene carbonate, propylene carbonate, and dimethyl carbonate; ethylene carbonate, propylene carbonate, and methylethyl carbonate; ethylene carbonate, propylene carbonate, and diethylcarbonate; ethylene carbonate, dimethyl carbonate, and methylethyl carbonate; ethylene carbonate, dimethyl carbonate, and diethyl carbonate; ethylene carbonate, methylethyl carbonate, and diethylcarbonate; ethylene carbonate, dimethyl carbonate, methylethyl carbonate, and diethylcarbonate; ethylene carbonate, propylene carbonate, dimethyl carbonate, and methylethyl carbonate; ethylene carbonate, propylene carbonate, dimethyl carbonate, and diethyl carbonate; ethylene carbonate, propylene carbonate, methylethyl carbonate, and diethylcarbonate; and ethylene carbonate, propylene carbonate, dimethyl carbonate, methylethyl carbonate, and diethylcarbonate.

The mixing ratio of the cyclic carbonate and the linear carbonate is determined based on the weight, and ranges from 1:99 to 99:1. According to another embodiment, it ranges from 5:95 to 70:30. According to a further embodiment, it ranges from 10:90 to 60:40.

Within the range of the mixing ratios, it is possible to provide a non-aqueous electrolyte having excellent electroconductivity without deteriorating the charge and discharge characteristics of the lithium rechargeable battery.

Further, the lithium salt may include, but is not limited thereto, $LiPF_6$, $LiBF_4$, $LiClO_4$, $LiAsF_6$, $Li_2SiF_6$, $LiOSO_2C_kF_{(2k+1)}$ (k is an integer of 1 to 8), $LiPF_n(C_kF_{2k+1})_{(6-n)}$ (n is an integer of to 5, and k is an integer of 1 to 8), and so on.

It may also include a lithium salt such as $LiC(SO_2R^5)$, $(SO_2R^6)$, $(SO_2R^7)$, $LiN(SO_2OR^8)$, $(SO_2OR^9)$, $LiN(SO_2R^{10})$, $(SO_2OR^{11})$, $LiN(SO_2R^{12})$, $(SO_2R^{13})$, and so on. The $R^5$ to $R^{13}$ may be identical to each other or independent, and they are perfluoroalkyl groups having C1 to C8. The lithium salt can be independently used, or mixed with two or more kinds thereof.

The non-aqueous electrolyte may be obtained by mixing a polymer such as PEO (polyethylene oxide), PVA (polyvinyl alcohol) and so on with said lithium salt. Alternatively, it may include a polymer electrolyte prepared by impregnating the non-aqueous solvent and lithium salt in a high-swelling polymer.

The lithium rechargeable battery according to one embodiment may further include any required members in addition to a positive electrode, a negative electrode, and a non-aqueous electrolyte. For example, it may further include a separator in a space between the positive electrode and the negative electrode.

The separator is an essential element unless the non-aqueous electrolyte is a polymer electrolyte, and the separator may include any conventional separator such as a porous polypropylene film, a porous polyethylene film, and so on.

As described above, since the crystalline structure aid suppresses deterioration of crystalline structure of the negative active material during charge and discharge, a negative electrode including the crystalline structure aid can inhibit decomposition of a non-aqueous electrolyte. As a result, the negative electrode can improve cycle-life of a rechargeable lithium battery.

The crystalline structure aid can inhibit a crystalline structure of a negative active material and cycle characteristics.

The following examples illustrate the present invention in more detail. However, it is understood that the present invention is not limited by these examples.

Experimental Example 1

Example 1

$V_2O_3$ powder and $Li_2CO_3$ powder were mixed to provide a powdery mixture. The molar ratio of lithium and vanadium was adjusted to obtain Li:V=1.1:0.9. The mixed powder was fired under a nitrogen atmosphere at 1100° C. for 5 hours to provide a lithium vanadium composite oxide (negative active material) having a composition of $Li_{1.1}V_{0.9}O_2$.

CeO2 powder and ZrO2 powder were mixed to provide a powdery mixture. The molar ratio of cerium and zirconium was adjusted to provide Ce:Zr=7:3.

The powdery mixture of cerium and zirconium was fired under an air atmosphere at 800° C. for 3 hours to provide a cerium zirconium composite oxide (crystalline structure aid) having a composition of $Ce_{0.7}Zr_{0.3}O_{2-x}$ (x=0.1).

Then, 45 wt % of the lithium vanadium composite oxide, 3 wt % of the crystalline structure aid, 42 wt % of graphite powder, and 10 wt % of polyvinylidene were mixed. The mixture was added into N-methylpyrrolidone to prepare an active material composition. Then, the active material composition was coated on a Cu foil, dried, and cut into an appropriate size to provide a negative electrode for a rechargeable lithium battery.

91 wt % of $LiCoO_2$ powder, 3 wt % of acetylene black, and 6 wt % of polyvinylidene were mixed and dissolved in N-methylpyrrolidone to provide an active material composition. The active material composition was coated on an Al foil, dried, and cut into an appropriate size to provide a positive electrode for a rechargeable lithium battery.

A polypropylene separator was interposed between the provided positive electrode and negative electrode, and wound together with the positive electrode and the negative electrode to provide an electrode. The electrode was inserted into a cylindrical casing for a battery that was then subjected to terminal welding.

Subsequently, ethylene carbonate (EC) and dimethyl carbonate (DMC) were mixed at a volume ratio of EC:DMC=3:7 to provide a mixed solvent. 1.0M LiPF6 was dissolved in the mixed solvent to provide an electrolyte solution. The electrolyte solution was input into the battery casing, and the battery casing was sealed to provide a lithium rechargeable cell according to Example 1.

Example 2

A lithium vanadium composite oxide (negative active material) having a composition of $Li_{1.1}V_{0.9}O_2$ and a cerium zirconium composite oxide (crystalline structure aid) having a composition of $Ce_{0.7}Zr_{0.3}O_{1.9}$ were prepared in accordance with the same procedure as in the foregoing Example 1.

Subsequently, the negative active material and the crystalline structure aid were mixed in a weight ratio of negative active material:crystalline structure aid=15:1, pulverized in a mortar for 1 hour, and fired under an air atmosphere at 800° C. for 3 hours.

48 wt % of the fired resultant, 42 wt % of graphite powder, and 10 wt % of polyvinylidene were mixed and dissolved in N-methylpyrrolidone to prepare an active material composition. The active material composition was coated on a Cu foil, dried, and cut into an appropriate size to provide a negative electrode for a lithium rechargeable battery.

Then, a positive electrode for a rechargeable lithium battery was prepared in accordance with the same procedure as in Example 1. An electrode including the prepared positive electrode, the negative electrode, and a separator was obtained in accordance with the same procedure as in Example 1. The electrode was inserted into a cylindrical battery casing, and had an electrolyte solution in which 1.0M LiPF6 was dissolved in a mixed solvent of EC:DMC=3:7 added thereto. Then, the battery casing was sealed to provide a lithium rechargeable cell according to the foregoing Example 2.

Example 3

A lithium rechargeable cell was provided in accordance with the same procedure as in Example 2, except that the crystalline structure aid was $CeO_{2-x}$ (x=0.1).

Example 4

A lithium rechargeable cell was provided in accordance with the same procedure as in Example 2, except that the crystalline structure aid was $ZrO_{2-x}$ (x=0.1).

Comparative Example 1

A lithium rechargeable cell was provided in accordance with the same procedure as in Example 1, except that the negative electrode was obtained by mixing 48 wt % of a lithium vanadium composite oxide, 42 wt % of graphite powder, and 10 wt % of polyvinylidene.

Assessment

Lithium rechargeable cells according to Examples 1 to 4 and Comparative Example 1 were charged with a constant current and constant voltage for a first cycle until the charge ending voltage reached 4.2V at a charge current of 0.5 C, and then they were discharged with a constant voltage until the discharge ending voltage reached 2.75V at a discharge current of 0.2 C or 2 C. Thereby, the discharge capacity of each cell was measured on the first discharge.

After the first charge, each cell was charged with a constant current and a constant voltage until the charge ending voltage reached 4.2V at a charge current of 0.5 C, and was discharged with a constant voltage until the discharge ending voltage reached 2.75V at a discharge current of 2 C. These charge and discharge cycles were repeated 30 times.

The 30th discharge capacity was measured.

Another cell was prepared, and after charging at the first cycle, it was charged with a constant current and a constant voltage until the charge ending voltage reached 4.2V at a charge current of 0.5 C, and it was discharged with a constant voltage until the discharge ending voltage reached 2.75V at a discharge current of 2 C. These charge and discharge cycles were repeated 200 times.

The 200th discharge capacity was measured.

For each of lithium rechargeable cells according to Examples 1 to 4 and Comparative Example 1, the capacity ratio (2 C/0.2 C) of the 30th discharge capacity at 2 C to the first discharge capacity at 0.2 C was calculated.

The capacity ratio (2 C/0.2 C) was calculated as a percentage (%) of the capacity ratio of each rechargeable cell according to Examples 1 to 4 relative to that of Comparative Example when the capacity ratio (2 C/0.2 C) of the lithium rechargeable cell according to Comparative Example 1 was set as 100%. The results are shown in the following Table 1 as capacity ratio (2 C/0.2 C) (%).

Furthermore, when the 200th discharge capacity at 0.5 C of the lithium rechargeable cell according to Comparative Example 1 was recalculated as 100, the 200th discharge capacity at 0.5 C of each lithium rechargeable cell according to Examples 1 to 4 was obtained as a percentage of that of Comparative Example 1. The results are shown in the following Table 1 as discharge capacity (%).

TABLE 1

| | Capacity ratio (%, 2 C/0.2 C) | Discharge capacity (%, 0.5 C 200$^{th}$ cycle) |
|---|---|---|
| Example 1 | 107 | 108 |
| Example 2 | 110 | 112 |
| Example 3 | 108 | 110 |
| Example 4 | 105 | 105 |
| Comparative Example | 100 | 100 |

As shown in Table 1, lithium rechargeable cells according to Examples 1 to 4 had higher capacity ratios (2 C/0.2 C) than that of Comparative Example 1. That proved that the lithium rechargeable cells according to Examples 1 to 4 improved the high rate discharge characteristics.

Particularly, it shows that the capacity ratio % 2 C/0.2 C according to Example 2 was higher than that of Example 1. It is postulated that, due to the preliminary firing of the negative active material and the crystalline structure aid, the crystalline structure aid was adhered to the surface of the negative active material and the crystalline structure aid effectively recovered the oxygen defect of the negative active material, so the cell increased in capacity ratio.

From the result, it is understood that the lithium rechargeable cells according to Examples 1 to 4 had higher 200th discharge capacities than that of Comparative Example 1. Thereby, it is established that the cycle characteristics of lithium rechargeable cells according to Examples 1 to 4 were improved. The discharge capacity of Example 2 was higher than that of Example 1. Similar to the capacity ratio case, it is postulated that this is because the crystalline structure aid was adhered to the surface of the negative active material and the inhibition of crystallinity deterioration effectively recovered the oxygen defect of the negative active material.

Experimental Example 2

Lithium rechargeable cells were provided in accordance with the same procedure as in Example 1, except that the crystalline structure aid was added at 0 wt % (Comparative Example 1), 1 wt % (Example 5), 3 wt % (Example 1), 5 wt % (Example 6), 10 wt % (Example 7), 20 wt % (Example 8), and 30 wt % (Reference Example 1).

The obtained lithium rechargeable cells according to Example 1, Examples 5 to 8, and Reference Example 1 were charged and discharged for the first cycle in accordance with the same procedure as in Example 1 to measure a first discharge capacity, at 0.2 C.

After the first cycle, the lithium rechargeable cells according to Example 1, Examples to 8, and Reference Example 1 were charged and discharged for 30 cycles in accordance with the same procedure as in Example 1 to measure the 30th discharge capacity, at 0.2 C.

After the first discharge, the lithium rechargeable cells according to Example 1, Examples 5 to 8, and Reference Example 1 were measured for the 200th discharge capacity at 0.5 C in accordance with the same procedure as in Example 1.

For the cells according to Example 1, Examples 5 to 8, and Reference Example 1, the capacity ratio (2 C/0.2 C) of the 30th discharge capacity at 2 C to the first discharge at 0.2 C was calculated. The capacity ratio (2 C/0.2 C) of each lithium rechargeable cell according to Example 1, Examples 5 to 8, and Reference Example 1 was calculated as a percentage of that of Comparative Example 1, when the capacity ratio (2 C/0.2 C) of the cell according to Comparative Example 1 was set as 100. The results are shown in FIG. 1 as a capacity ratio (2 C/0.2 C) (%).

The 200th discharge capacity at 0.5 C of each lithium rechargeable cells according to Example 1, Examples 5 to 8, and Reference Example 1 was calculated as a percentage of that of Comparative Example 1 when the discharge capacity at 0.5 C of the cell according to Comparative Example 1 was set to 100. The results are shown in FIG. 3 as a discharge capacity (%).

Figure 1:
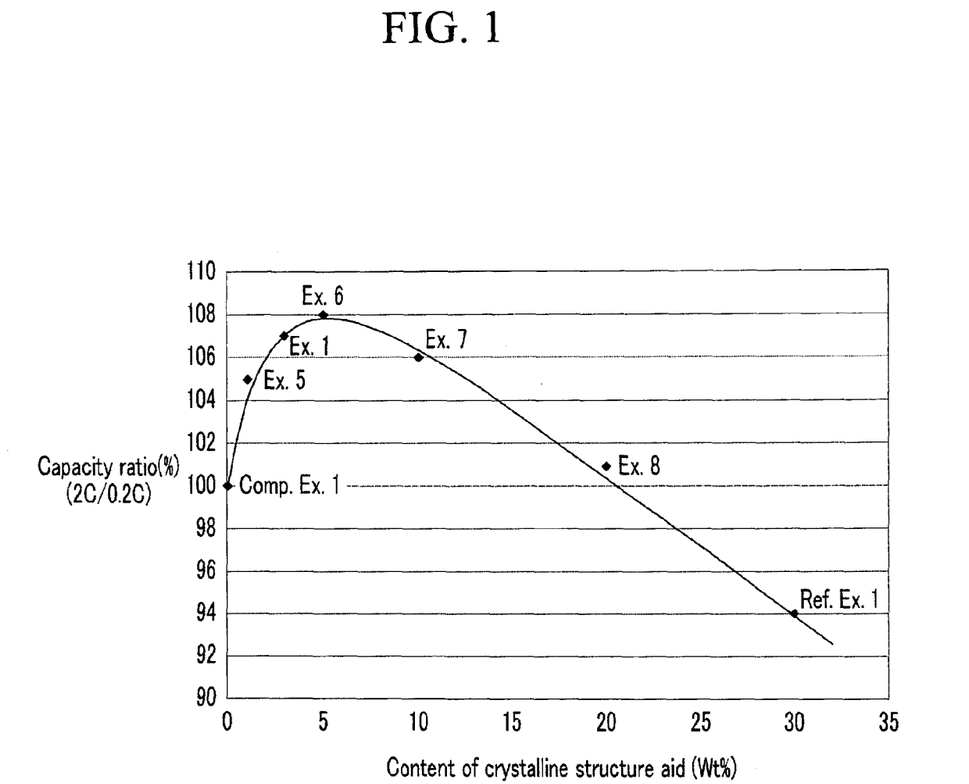
FIG. 1 is a two coordinate graph illustrating a relationship between contents of a crystalline structure aid and capacity ratio (2 C/0.2 C) of a cell according to Example 2.

As shown in FIG. 1, the capacity ratio (2 C/0.2 C) indicates the highest when the crystalline structure aid was added at 5 wt %. The results show that the capacity ratio (2 C/0.2 C) was improved when the crystalline structure aid was added at 0 wt % to 20 wt %.

In order to improve the high rate discharge characteristics, the crystalline structure aid is to be added in a range of from 0 wt % to 20 wt %. According to another embodiment, it ranges from 0 wt % to 10 wt %.

Figure 3:
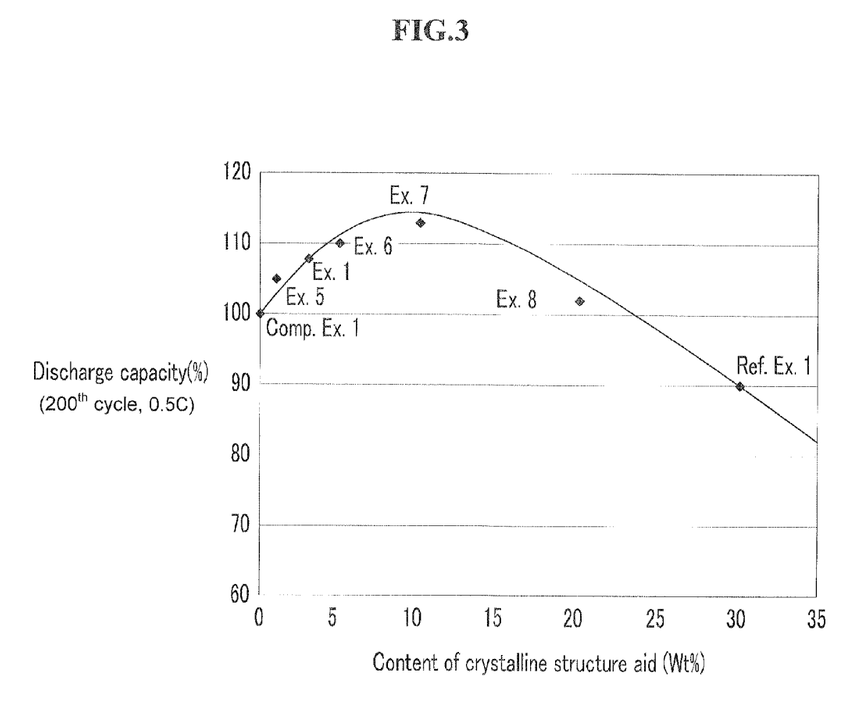
FIG. 3 is a two coordinate graph illustrating a relationship between contents of a crystalline structure aid and the 200$^{th}$ cycle discharge capacity at 0.5 C of a cell according to Example 2.

As shown in FIG. 3, the 200th discharge capacity at 0.5 C reached the highest point when the crystalline structure aid was added at 10 wt %.

Furthermore, the results show that the 200th discharge capacity at 0.5 C was improved when the crystalline structure aid was added at more than 0 wt % and 20 wt % or less.

In order to improve the cycle characteristics, the crystalline structure aid was added at more than 0 wt % and 20 wt % or less. According to another embodiment, it is more than 0 wt % and 10 wt % or less.

As shown in FIGS. 1 and 3, in order to improve both the high rate discharge characteristics and the cycle characteristics, the crystalline structure aid was added at more than 0 wt % and 20 wt % or less. According to another embodiment, it was added at more than 0 wt % and 10 wt % or less. According to a further embodiment, it was added at more than 0 wt % and 5 wt % or less.

Experimental Example 3

A lithium rechargeable cell to which the crystalline structure aid was added and a lithium rechargeable cell to which the crystalline structure aid was not added were obtained in accordance with the same procedure as in Example 1, except that the crystalline structure aid was added at 0 wt % and at 5 wt % to the negative electrode.

The two kinds of lithium rechargeable cells with the crystalline structure aid or without the crystalline structure aid were charged and discharged for the first cycle in accordance with the same procedure as in Example 1.

Then, they were charged with a constant current and a constant voltage until the charge ending voltage reached to 4.2V at a 0.5 C charge current, then they were discharged with a constant voltage until the discharge ending voltage reached 2.75V. This charge and discharge was repeated for 50, 100, and 200 cycles.

After the charge and discharge cycles, the lithium rechargeable cells were disassembled to obtain the negative active mass, and the electrolyte solution was washed and dried to prepare a test sample for X-ray diffraction. Each test sample was subjected to X-ray diffraction analysis (XRD).

For the light source for XRD analysis, a CuKα line was used and it was examined at a scanning speed of 1°/min.

The results are shown in the following Table 2.

TABLE 2

| | Example 1 | | | Example 2 | | | Example 3 | | | Example 4 | | | Comparative Example 1 | | |
|---|---|---|---|---|---|---|---|---|---|---|---|---|---|---|---|
| Charge and discharge cycle | 50 | 100 | 200 | 50 | 100 | 200 | 50 | 100 | 200 | 50 | 100 | 200 | 50 | 100 | 200 |
| Intensity ratio (003/001) | 5.5 | 4.2 | 4.1 | 5.8 | 5.5 | 5.1 | 5.8 | 5.2 | 5.0 | 5.2 | 4.5 | 4.3 | 5.2 | 4.1 | 2.9 |

As shown in Table 2, the cells including a crystalline structure aid according to Examples 1 to 4 had an intensity ratio (003/001) of 4.1, 5.1, 5.0, and 4.3, respectively, even though the charge and discharge cycle was repeated 200 times. On the other hand, the cell according to Comparative Example 1 had a remarkably lower intensity ratio (003/001) since the intensity of the (003) plane was remarkably decreased. From the results, it is found that the cells including the crystalline structure aid according to Examples 1 to 4 maintained the intensity ratio even though the charge and discharge were repeated, so it prevented the structure of the negative active material from breaking.

Under the same condition, for the lithium rechargeable cell to which the crystalline structure aid was added according to Example 3 and the lithium rechargeable cell to which the crystalline structure aid was not added according to Comparative Example 1, the charge and discharge were repeated for 50 cycles. For the lithium rechargeable cell to which the crystalline structure aid was not added, the charge and discharge were repeated for 300 cycles.

After the charge and discharge cycles, the lithium rechargeable cells were disassembled to obtain the negative active mass, and the electrolyte solution was washed and dried to prepare a test sample for X-ray diffraction.

Each test sample was subjected to an X-ray diffraction analysis.

The light source for XRD analysis was a CuKα line, and it was examined at a scanning speed of 1°/min.

Figure 4:
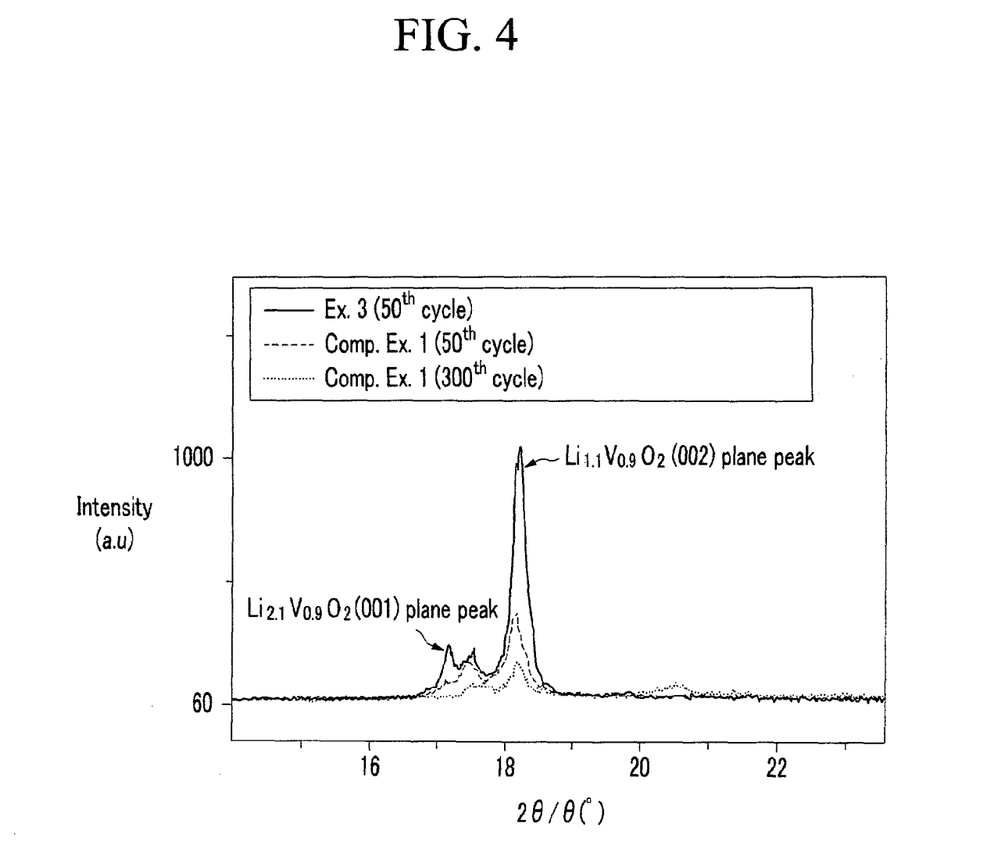
FIG. 4 is a two coordinate graph illustrating X-ray diffraction patterns of the negative active material (50$^{th}$ cycle) of the cell according to Example 3 and the negative active material (50$^{th}$ cycle, 300$^{th}$ cycle) of the cell according to Comparative Example 1.

The results are shown in FIG. 4.

As shown in FIG. 4, the rechargeable lithium cell to which the crystalline structure aid was added had a diffraction peak of the (003) plane of $Li_{1.1}V_{0.9}O_2$ at around 18°, indicating that the crystalline structure was not deteriorated.

On the other hand, the rechargeable lithium cell to which the crystalline structure aid was not added had a diffraction peak of the (003) plane of $Li_{1.1}V_{0.9}O_2$ at around 18°, but the peak intensity was remarkably low compared to that of the lithium rechargeable cell to which the crystalline structure aid was added.

Furthermore, the lithium rechargeable cell to which the crystalline structure aid was not added had a diffraction peak of the (001) plane of $Li_{1.1}V_{0.9}O_2$ around 17° to 18°.

From the results, the crystalline structure of the negative active material was deteriorated in the lithium rechargeable cell to which the crystalline structure aid was not added. In addition, the deterioration progressed while repeating the charge and discharge cycles.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative electrode for a rechargeable lithium battery, comprising:
   a current collector; and
   a negative active mass disposed on the current collector and including a negative active material including a lithium vanadium composite oxide and a crystalline structure aid wherein the lithium vanadium composite oxide is $Li_xM_yV_zO_{2+d}$, where $0.1 \leq x \leq 2.5$, $0 \leq y \leq 0.5$, $0.5 \leq z \leq 1.5$ and $0 \leq d \leq 0.5$, and M is selected from the group consisting of Al, Cr, Mo, Ti, W, Zr and combinations thereof,
   wherein the crystalline structure aid is an oxide or a composite oxide of cerium, an oxide or composite oxide of copper, a zirconium composite oxide, or an iron composite oxide, wherein the composite oxides include one or more additional metals selected from the group consisting of Ti, W, Ni, Cu, Ce, Al, Si, Be, Mg, Ca, Sr, Ba, Ra, Bi, Y, Co, Mn, Nb, Mo, Sn, and a rare earth element.

2. The negative electrode of claim 1, wherein the crystalline structure aid is selected from the group consisting of cerium oxide, a cerium composite oxide, copper oxide, and combinations thereof.

3. The negative electrode of claim 1, wherein the crystalline structure aid is an iron composite oxide and the iron composite oxide is selected from the group consisting of $LaSrFeO_{3-x}$, $CaTi_{0.8}Fe_{0.2}O_{3-x}$, $SrFeCo_{0.5}O_{4-x}$, where x is in the range of 0-0.4, and combinations thereof.

4. The negative electrode of claim 2, wherein the crystalline structure aid is a copper oxide and the copper oxide is $CuO_{2-x}$, where x is in the range of 0-0.2.

5. The negative electrode of claim 1, wherein the crystalline structure aid is included in an amount of 20 wt % or less with respect to the total weight of the negative active mass.

6. The negative electrode of claim 5, wherein the crystalline structure aid is included in an amount of 10 wt % or less with respect to the total weight of the negative active mass.

7. The negative electrode of claim 6, wherein the crystalline structure aid is included in an amount of 5 wt % or less with respect to the total weight of the negative active mass.

8. The negative electrode of claim 7, wherein the crystalline structure aid is included in an amount of 0.001 wt % to 5 wt % with respect to the total weight of the negative active mass.

9. The negative electrode of claim 1, wherein the negative electrode has a (003)/(001) intensity ratio of 3 to 6 during charge and discharge in an X-ray diffraction pattern using CuKα.

10. The negative electrode of claim 1, wherein the crystalline structure aid is attached to a surface of the negative active material.

11. A rechargeable lithium battery, comprising:
    a negative electrode comprising:
       a current collector; and
       a negative active mass disposed on the current collector and including a negative active material including a lithium vanadium composite oxide and a crystalline structure aid wherein the lithium vanadium composite oxide is $Li_xM_yV_zO_{2+d}$, where $0.1 \leq x \leq 2.5$, $0 \leq y \leq 0.5$, $0.5 \leq z \leq 1.5$ and $0 \leq d \leq 0.5$, and M is selected from the group consisting of Al, Cr, Mo, Ti, W, Zr and combinations thereof;
    a positive electrode including a positive active material; and
    a non-aqueous electrolyte,
    wherein the crystalline structure aid is an oxide or a composite oxide of cerium, an oxide or composite oxide of copper, a zirconium composite oxide, or an iron composite oxide, wherein the composite oxides include one or more additional metals selected from the group consisting of Ti, W, Ni, Cu, Ce, Al, Si, Be, Mg, Ca, Sr, Ba, Ra, Bi, Y, Co, Mn, Nb, Mo, Sn, and a rare earth element.

12. The rechargeable lithium battery of claim 11, wherein the crystalline structure aid is selected from the group consisting of cerium oxide, a cerium composite oxide, copper oxide, and combinations thereof.

13. The rechargeable lithium battery of claim 12, wherein the crystalline structure aid is $Ce_xZr_yM_zO_{2-a}$, where $x+y+z=1$, $0<a<1$, and M is selected from the group consisting of Ti, W, Ni, Cu, Fe, Al, Si, Be, Mg, Ca, Sr, Ba, Ra, Bi, Y, Co, Mn, Nb, Mo, Sn, a rare earth element, and combinations thereof.

14. The rechargeable lithium battery of claim 11, wherein the crystalline structure aid is an iron composite oxide and the iron composite oxide is selected from the group consisting of $LaSrFeO_{3-x}$, $CaTi_{0.8}Fe_{0.2}O_{3-x}$, $SrFeCo_{0.5}O_{4-x}$ where x is in the range of 0-0.4, and combinations therefore.

15. The rechargeable lithium battery of claim 12 wherein the crystalline structure aid is a copper oxide and the copper oxide is $CuO_{2-x}$, where x is in the range of 0-0.2.

16. The rechargeable lithium battery of claim 11, wherein the crystalline structure aid is included in an amount of 20 wt % or less with respect to the total weight of the negative active mass.

17. The rechargeable lithium battery of claim 16, wherein the crystalline structure aid is included in an amount of 10 wt % or less with respect to the total weight of the negative active mass.

18. The rechargeable lithium battery of claim 17, wherein the crystalline structure aid is included in an amount of 5 wt % or less with respect to the total weight of the negative active mass.

19. The rechargeable lithium battery of claim 18, wherein the crystalline structure aid is included in an amount of 0.001 wt % to 5 wt % with respect to the total weight of the negative active mass.

20. The rechargeable lithium battery of claim 11, wherein the negative electrode has a (003)/(001) intensity ratio of 3 to 6 during charge and discharge in a X-ray diffraction pattern using CuKα.

21. The rechargeable lithium battery of claim 11, wherein the crystalline structure aid is attached to a surface of the negative active material.

* * * * *